United States Patent
Hajikano et al.

(12)

(10) Patent No.: US 6,284,137 B1
(45) Date of Patent: Sep. 4, 2001

(54) POLYSULFONE POROUS MEMBRANE AND A METHOD OF MANUFACTURING THE SAME

(75) Inventors: Akira Hajikano; Kei Murase; Jun Kamo, all of Otake (JP)

(73) Assignee: Mitsubishi Rayon Co., Ltd., Hiroshima (JP)

( * ) Notice: Subject to any disclaimer, the term of this patent is extended or adjusted under 35 U.S.C. 154(b) by 0 days.

(21) Appl. No.: 09/249,165

(22) Filed: Feb. 12, 1999

Related U.S. Application Data

(63) Continuation of application No. 08/750,255, filed as application No. PCT/JP95/01097 on Jun. 5, 1995, now abandoned.

(30) Foreign Application Priority Data

Jun. 7, 1994 (JP) .................................................. 6-125559

(51) Int. Cl.⁷ .................................................. B01D 71/68
(52) U.S. Cl. ............................... 210/500.41; 210/500.27; 210/500.23
(58) Field of Search .................. 210/500.41, 500.23, 210/500.27; 96/4–11

(56) References Cited

U.S. PATENT DOCUMENTS

| 4,906,375 | 3/1990 | Heilmann | 210/500.23 |
| 5,049,276 | 9/1991 | Sasaki | 210/500.23 |
| 5,340,480 | 8/1994 | Kanada et al. | 210/500.23 |
| 5,401,410 | 3/1995 | Bell et al. | 40/500.41 |
| 5,436,068 | 7/1995 | Kobayashi et al. | 210/500.41 |
| 5,746,916 | 5/1998 | Kamo et al. | 210/500.23 |
| 5,762,798 | * 6/1998 | Wenthold et al. . | |
| 6,045,899 | * 4/2000 | Wang et al. . | |

FOREIGN PATENT DOCUMENTS

| 2020300 A | 11/1979 | (GB) . |
| 53-44486 | 4/1978 | (JP) . |
| 54-144456 | 11/1979 | (JP) . |
| 60-51504 | 3/1985 | (JP) . |
| 63-99325 | 4/1985 | (JP) . |
| 62-221402 | 9/1987 | (JP) . |
| 1-184001 | 7/1989 | (JP) . |
| 3-137982 | 6/1993 | (JP) . |

\* cited by examiner

*Primary Examiner*—Ana Fortuna
(74) *Attorney, Agent, or Firm*—Finnegan, Henderson, Farabow, Garrett & Dunner, L.L.P.

(57) ABSTRACT

The present invention relates to a polysufone porous membrane having a high water flux, an excellent resistance to moist heat and an excellent repercolation characteristic, and which comprises a mixed polymer having polyarylsulfone and polyethersulfone at a ratio of from 9/1–1/9 (by weight), the membrane being a graded porous membrane forming a cross-linked polymer network wherein a number of micropores being interconnected from one surface to the other surface, and the membrane comprising two layers wherein one layer being a dense layer having a number of pores with pore sizes in the range of 0.01–1 μm and thereby having a separation function, and the other layer being a graded type supporting layer supporting said dense layer and having a pore size distribution wherein the pores existing therein and having sizes of 1–100 μm increase continuously from the dense layer side toward the other surface side, wherein the separation particle size is not larger than 0.5 μm, and a method of manufacturing the same.

5 Claims, No Drawings

POLYSULFONE POROUS MEMBRANE AND A METHOD OF MANUFACTURING THE SAME

This is a continuation of application Ser. No. 08/750,255 filed Mar. 21, 1997, now abandoned, which is a 371 of PCT/JP95/01097 filed Jun. 5,1995.

FIELD OF THE INVENTION

The present invention relates to an asymmetric polysulfone porous membrane which is a porous membrane capable of being effectively used in ultra filtration and precision filtration of fluid, and the membrane is comprising a dense layer functioning as a separation layer, and a supporting layer having a graded pore size distribution wherein the size of the existing pores therein gradually increases from the dense layer side to the opposite surface, and to a method of manufacturing the same. The present invention relates, especially, to an asymmetric polysulfone porous membrane capable of being used from a dry condition without any treatment to impart hydrophilicity, and the membrane having an excellent resistance to moist heat, having an excellent re-percolation characteristic (a permeability of a membrane when water is percolated at a second time, after the membrane is percolated with water and dried), and having an especially excellent re-percolation characteristic to hot water, and to a method of manufacturing the same.

BACKGROUND OF THE INVENTION

Various development efforts to have porous separation membrane having a good separation property and being capable of allowing hot water to permeate have been made, and a polysulfone porous membrane has especially received much attention. The invention of a thermal resistant polysulfone porous membrane using polysulfone according to the general formula of (1) and polyethersulfone according to the general formula of (2) are described in Japanese Laid-Open Patent Publication Nos. Sho63-99325 and Hei5-137982.

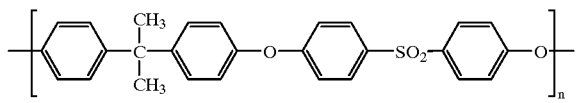
(1)

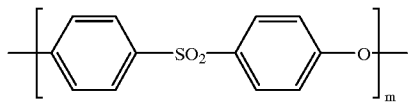
(2)

Among the above-mentioned inventions, the polysulfone porous membrane using the polysulfone of the formula (1) has a fairly good permeability, but it has a drawback wherein the membrane ruptures or becomes unsuitable to be used as a separation membrane due to its morphological change when it is subjected to a treatment of moist heat under a high temperature and a high pressure.

In addition, although the polyethersulfone porous membrane using the polyethersulfone of the formula (2) is characterized by having a relatively good re-percolation characteristic and resistance to moist heat, its performance is not sufficient as a ultra filtration membrane or as a precision filtration membrane because its water flux is extremely low by being at not more than 2 L/m$^2$.hr.mmHg.

An invention directed to a polyallylsulfone porous membrane having a chemical formula of (3) is described in Japanese Laid-Open Patent Publication No. Hei1-184001. This polyarylsulfone porous membrane has an extremely high resistance to moist heat, however, it has a drawback that its water flux is low at not more than 2 L/m$^2$.hr.mmHg and it has a low hydrophilicity.

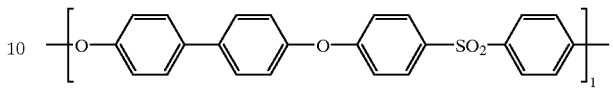
(3)

The inventions directed to a porous membrane comprising a mixture of polysulfone and polyethersulfone are described in Japanese Laid-Open Patent Publication Nos. Sho54-144456 and Sho62-221402. The polysulfone porous membrane of this type has a relatively high water flux, but has a drawback that its resistance to moist heat is not sufficient and its water flux decreases rapidly when a hot water having a temperature not less than 80° C. is percolated for an extended period of time, and while its mechanical strength is not sufficient and its ease of handling is not satisfactory.

In addition, in case of a porous membrane obtained from materials of polysulfone and polyethersulfone, because the material itself is hydrophobic, during the manufacture of a membrane by a wet forming method, a process of imparting hydrophilicity to the membrane has been employed, wherein pores are formed by a solidification process while adding a large quantity of hydrophilic additives such as polyethylene glycol and polyvinylpyrrolidone to the dope, or then after these hydrophilic additives are cross-linked, or a hydrophilic polymer is coated on the membrane surface after the formation of pores followed by maintaining the hydrophilic polymer on the membrane surface.

Generally, to provide a sufficient hydrophilicity to the membrane, it is necessary to have the equilibrium rate of moisture content of the membrane at more than 2% by weight by employing the above mentioned treatment.

There was a problem where the hydrophilic additive or the hydrophilic polymer of these types dissolves during the use of the membrane from the membrane thus obtained by these manufacturing methods, because a large quantity of hydrophilic additives or hydrophilic polymer and the like are retained inside of the membrane or on the surface thereof.

Furthermore, in case of a hollow fiber membrane obtained by the conventional wet forming methods to increase the water flux, it was necessary to reduce the membrane thickness or to increase the porosity of the membrane. However, when such operation is employed, a drawback may be encountered wherein the ease of handling of the membrane, and thus the ease of handling during a production process, decreases because the mechanical properties (breaking strength and breaking extension) decrease.

DISCLOSURE OF THE INVENTION

In view of these facts, the inventors of the present invention carried out various tests to obtain polysulfone porous membrane having a high water flux, an excellent resistance characteristic to moist heat, no requirement for a treatment to make the membrane hydrophilic, a good re-percolation property, and an excellent mechanical strength, and then established the present invention after having found that a desired polysulfone porous membrane can be manufactured from a polymer mixture obtained by mixing polyarylsulfone of the formula (3) and polyethersulfone of the formula (2) at a specific weight ratio.

The gist of the present invention relates to a polysufone porous membrane which comprises a mixed polymer having polyarylsulfone and polyethersulfone at a ratio of 9/1–1/9 (by weight), the membrane being a graded porous membrane forming a cross-linked polymer network, wherein a number of micropores being interconnected from one surface to the other surface, and the membrane comprising two layers wherein one layer being a dense layer having a number of pores with pore sizes of 0.01–1 μm and thereby having a separation function, and the other layer being a graded type supporting layer supporting said dense layer and having a pore size distribution wherein the pores existing therein and having sizes of 1–100 μm continuously increase from the dense layer side toward the other surface side, wherein the separation particle size being not larger than 0.5μm, and a method of manufacturing the same.

BEST EMBODIMENT OF THE INVENTION

With the polysulfone porous membrane of the present invention, by maintaining of the ratio of composition of polyarylsulfone (hereinafter referred to as PAS) to polyethersulfone (hereinafter referred to as PES) at PAS/PES= 9/1–1/9 by weight, or preferably at 7/3–3/7 by weight, the water flux thereof can be especially set at a high value of being not less than 7L/m$^2$ .hr.mmHg, and the resistance to moist heat can be good whereby a good permeability can be maintained even when hot water having a temperature of not less than 80° C. is percolated for an extended period of time. It also has a large advantage that the permeation pressure required when a membrane in a dry condition is percolated can be set at an extremely low pressure of being not more than 0.5 Kg/cm$^2$.

The polysulfone porous membrane made from a polysulfone mixture having a mixing ratio of PAS and PES by weight being below 1/9 is not preferable, because it has a poor resistance to moist heat and its permeation performance decreases drastically when hot water having a temperature of not less than 80° C. is percolated for an extended period of time.

On the other hand, polysulfone membrane made from a polysulfone mixture having a mixing ratio of PAS/PES by weight being more than 9/1 does not show a sufficient permeability, and it shows a tendency to require a higher permeation pressure especially when a membrane in a dry condition is percolated with water.

Any component other than the main components PAS and PES can be used as a component for forming a membrane, as long as the various membrane characteristics of the present invention are not impaired, and, for example, alcohols such as glycerin, inorganic salts such as lithium chloride, hydrophilic organic compounds such as polyvinylpyrrolidone and polyethylene glycol, and the like can be used.

However, a care must be paid in such applications of these compounds where the dissolution of the membrane forming component into the filtrate causes any problem.

Considering the aforementioned points, it is better to have a membrane composition wherein PAS and PES are present in a large total amount, and the total amount is preferably not less than 80% by weight.

One surface of the polysulfone porous membrane of the present invention comprises a dense layer which forms a mesh-like polymer network structure having many pores with pore sizes of 0.01–1 μm. This dense layer controls the separation property of the porous membrane, and the separation property of the membrane of the present invention is not more than 0.5 μm, and is especially not more than 0.2 μm. A membrane having micropores with pore sizes of less than 0.01 μm within the dense layer does not show any sufficient permeability, but on the other hand, when the pore sizes of the micropores within the dense layer become larger while being more than 1 μm, it is not preferable because its separation property decreases drastically. The thickness of the membrane is preferably 1–50 μm to maintain a good separation property of the porous membrane of the present invention and a high water flux. A dense layer having a membrane which is too thin is not preferable because it provides causes for the occurrence of pin-holes.

The porous membrane of the present invention has a supporting layer that supports the dense layer. In this supporting layer, a mesh-like polymer network structure is formed, wherein pores having pore sizes of 1–100 μm are provided while the sizes thereof increase continuously from one side, which is in touch with the separation layer, toward the other side.

By providing a dense layer and a supporting layer in such a membrane structure, a membrane with a sufficiently high mechanical strength can be obtained. The thickness of this supporting layer is preferably 30–1000 μm to impart the resistance strength against pressure.

In addition, because the water flux ratio obtained by the equation in the description related to the following examples is extremely high being at not less than 70%, and preferably being at not less than 80%, there is no need to treat the membrane as a membrane treated by an agent which imparts hydrophilicity (wetted membrane) like a conventional polysulfone porous membrane, wherein it has an excellent ease of handling.

The porous membrane of the present invention provides an excellent permeability by being comprised as described above, wherein even a dry membrane not having been treated by such an agent which imparts hydrophilicity as ethanol, ethylene glycol and glycerine (dry membrane) provides an extremely high water flux being of not less than 7 L/m$^2$.hr.mmHg when the percolation is effected under a pressure difference of 2 Kg/cm$^2$. Therefore, there is no need to have a treatment to impart hydrophilicity as required with the conventional polysulfone porous membrane, and there is also a large advantage that a problem of dissolution of hydrophilic additives during any use of the membrane does not occur.

Furthermore, with the porous membrane of the present invention, the maintenance ratio of breaking extension, which is defined in the description related to the following examples, of the membrane after a treatment under moist heat is extremely high being not less than 70%, or preferably being not less than 80%, whereby it exceeds the resistance property to moist heat of the conventional polysulfone porous membrane.

Although any known method may be employed in the manufacture of a porous separation membrane of the present invention, a method of wet forming from a polymer dope is preferably employed from the stand point of forming a porous structure having a large porosity and an asymmetric structure in the direction of a cross section of the membrane.

When such a polymer dope as described above is formed into a membrane by a wet forming method, any known method may be employed in both cases of obtaining geometries of a flat membrane and a hollow fiber membrane. In the former case, the polymer dope is extruded and then casted on a flat plate, followed by forming a membrane after immersing in an external solidifying solution. And in the latter case, for example, the polymer dope and the internal solidifying solution are extruded from the sheath side and core side, respectively, of a double annular sheath/core type nozzle, followed by being introduced into the external solidifying solution after letting it pass through an air gap (dry-wet spinning method) or without any air gap(wet spinning method), whereby a porous hollow fiber membrane structure is formed.

In this case of forming a flat membrane, the evaporation performance of a solvent in the original solution is different between the surface which is in contact with the flat plate and the other surface which is in contact with the air, when they are casted on a flat plate, whereby an asymmetric membrane structure is formed when it is solidified in the external solidifying solution. In case of a hollow fiber membrane, an asymmetric membrane structure is formed by changing the ratio of good solvent for polysulfone, while the solvent is existing in the internal and external solidifying solutions, respectively.

As for the external solidifying solution, a mixed solution of polysulfone and water is used, wherein the solution has a good solvent for polysulfone at a ratio of not more than 70% by weight, or preferably of 30–60% by weight. As for a good solvent for polysulfone, such compounds as dimethylacetoamide, N-methylpyrrolidone, dimethylsulfoxide, and dimethylfolmamide may be used.

During the manufacture of a hollow fiber membrane, when the polymer dope having a viscosity of not less than 200 cps at the time of extrusion is used, a steady extrusion of the polymer dope can be effected, whereby the occurrence of fiber break during the spinning process can be prevented. When the polymer dope having a viscosity of 1000–30000 cps is further preferably used, a further steady extrusion of the polymer dope can be effected, whereby a uniform membrane thickness of polysulfone membrane thus obtained can be provided, and in addition, the graded structure in the membrane cross section can be made into a predetermined structure. To have a viscosity of the polymer dope of more than 30000 cps requires an excessive amount of polyvinylpyrrolidone (hereinafter referred to as PVP) to beaded, while the content of polysulfone that forms the membrane decreases whereby the solidified membrane can not withstand the spinning tension force while causing many occurrence of fiber failures, and therefore it is not preferable. To adjust the viscosity of the polymer dope of not less than 200 cps, it is advisable to add PVP at a ratio of 1–10% by weight, or preferably of 3–7% by weight, to the polymer dope. It is further preferable to add more than two kinds of PVPs having different K-values obtained by the following equation (4) into the original solution.

$$\log Z = C\left(\frac{75K^2}{1+1.5KC} + K\right) \quad (4)$$

Wherein;

Z: Relative viscosity ηrel of a water solution having PVP at a concentration of C K: K-value$\times 10^{-3}$ C: Concentration of a PVP water solution. (W/V%)

In addition, when a PVP having a high molecular weight is used, a stabilization of spinning characteristics can be effected due to the increase of the viscosity of the polymer dope, and on the other hand, when a PVP having a low molecular weight is used, an increase of membrane performance, especially a high water flux can be effected.

Thus, when a PVP with a relatively high molecular weight having a K-value of not less than 50 and a PVP with a low molecular weight having a K-value which is lower than the K-value of the PVP with a high molecular weight by not less than 30 are used concurrently, the stability during the membrane forming of the polymer dope thus obtained increased, whereby the occurrence of fiber breaks during the membrane forming process and the occurrence of thick film spots were prevented.

Furthermore, the polysulfone porous membrane obtained from said polymer dope according to the present invention, especially when the membrane is a hollow fiber membrane, the form thereof is stable and a uniform cross sectional structure of the membrane can be obtained.

Furthermore, the membrane obtained from the polymer dope prepared by using such PVP mixture can so made as to have a good water flux. It is preferable to use a mixture having a mixing ratio of PVPs with a high K-value and a low K-value in the range of 1/30–1/1 by weight. PVP is a water soluble polymer, and in case of a polysulfone membrane having a large quantity of said polymer, there may be cases where said polymer dissolves into the filtrate during its use, and thus it is not preferable. Therefore, it is preferable to keep the content of PVP in the polysulfone membrane at not more than 2% by weight in the present invention. To prevent the dissolution of PVP from the polysulfone membrane, it is preferable to employ such methods as to effect cross-linking of PVP by subjecting to a thermal treatment at not less than 150° C. for a duration of not less than 2 hours or by subjecting a polysulfone membrane to irradiation of radioactive rays, especially of γ-rays. By subjecting especially to a irradiation treatment under radioactive rays while the inside of the polysulfone membrane is being impregnated by anti-oxidizing agent such as, for example, a water containing pyro sodium sulfite, PVP can be cross-linked without causing any damage to the polysulfone membrane.

Furthermore, a method of denaturing PVP which contains polysulfone into a water soluble PVP composite may be employed by immersing a polysulfone membrane which contains PVP in a polycarbonate acid solution such as polyacrylic acid and polymethacrylic acid, and followed by subjecting to a thermal treatment.

In case of the polysulfone porous membrane of the present invention, it is not required to have the equilibrium moisture content at higher than 2% by weight as required in the conventional polysulfone porous membrane. Therefore, there is no need to keep a large quantity of a water soluble polymer remained in the membrane, and thus there is no drawbacks where the water soluble polymer dissolves during the use of the membrane.

As for the external solidifying solution used during a wet spinning of the polymer dope, by using a water solution having polysulfone at not more than 70%, more preferably at 30–60%, by weight of the content of a good solvent for polysulfone, a polysulfone membrane having a graded membrane structure of the present invention can be efficiently obtained.

Furthermore, when the polysulfone membrane of the present invention is a hollow fiber membrane, it is advisable to use a water solution having a good solvent for polysulfone at not more than 90%, more preferably at 40–70%, by weight as an internal solidifying solution (core solidifying solution). Preferably, when a solidification condition is employed wherein the content of a good solvent for polysulfone within the external solidifying solution is lower than the content of a good solvent for polysulfone within the internal solidifying solution, a porous hollow fiber membrane may be manufactured in a more stable way wherein the membrane comprises a dense layer which is formed on the outer surface and a graded type supporting layer is provided inside thereof, and a graded type supporting layer has a pore size distribution wherein the pore sizes increase continuously from the dense layer toward the inside surface.

Furthermore, a porous membrane having a more highly permeable porous membrane can be obtained when the temperature of the external solidifying solution is set at 50° C.–80° C. By using a dry-wet spinning method as for the spinning method, a polysufone porous membrane of the present invention having a more desirable cross sectional structure of the membrane can be obtained. It is advisable to maintain the air gap, which is used in practicing a dry-wet spinning method, being at 1–50 mm. When a dry-wet spinning method is used, a further efficient control of the cross sectional structure of the membrane to be obtained can be achieved by controlling the humidity and temperature of the atmosphere. The solidified membrane thus obtained can be washed and dried by any of known methods. When any component, other than the polymer used as the main raw material, is added to the polymer dope or the solidifying solution, it is desirable to intensify the washing process to maintain the residue thereof as low as possible.

The present invention is further explained in detail by reference to examples described as follows.

Each abbreviation of polymer and each trade name thereof are as follows:

PAS=polyarylsulfone (RADEL R-5000 made by Teijin-Amoco)

PES=polyethersulfone (RADEL A-100 made by Teijin-Amoco)

PVP=polyvinylpyrrolidone
(K-15 (K-value at 15), K-30 (K-value at 30), K-60 (K-value at 60), K-90 (K-value at 90) and K-120 (K-value at 120) made by ICI)

The following evaluation methods were employed:

1) Resistance to Moist Heat

A sample of membrane was immersed for 21 days in a hot water at about 150° C. under pressure in an autoclave. A tensile test was carried out on a sample of membrane before and after a hot water treatment to obtain the maintenance ratio of breaking extension by the following equation. The measurement of the breaking extension was carried out in accordance with the following method of 7).

$$\text{Maintenance Ratio of Breaking Extension} = \frac{\text{Breaking Extension of a Membrane after Hot Water Treatment}}{\text{Breaking Extension of a Membrane before Hot Water Treatment}} \times 100(\%)$$

2) Water Flux

A treatment to impart hydrophilicity was employed wherein, when a sample is a sheet type membrane, a circular sample with a diameter of 43 mm is mounted in a filtration holder (UHP-43, made by Advantech), and when a sample is a hollow fiber membrane, a miniture module having an effective length of 70 mm was prepared, followed by being sufficiently immersed in ethanol, further followed by replacing this ethanol by water. Water was percolated through this membrane under a pressure difference of 2 Kg/cm$^2$ (in case of a hollow fiber membrane, pressure is exerted from outside), followed by a measurement of the amount of the percolated water during the period of from 1 minute to 2 minutes after the commencement of pressurization to obtain the water flux (L/m$^2$.hr.mmHg)

3) Water Flux Ratio

A water flux ratio was obtained by the following formula from the water flux of the hydrophilic membrane (wet membrane) obtained under a similar condition as that of the method of abovementioned 2) except that a pressure difference of 0.5 Kg/cm$^2$ was employed, and from the water flux obtained when a membrane without any treatment to impart hydrophilicity (dry membrane) was subjected to a pressure difference of 0.5 Kg/cm$^2$.

$$\text{Water Flux Ratio } (\%) = \frac{\text{Water Flux of a Dry Membrane}}{\text{Water Flux of a Wet Membrane}} \times 100(\%)$$

4) Surface Pore Size and Internal Structure

The membrane surface and the cross section thereof was observed under a scanning electron microscope (Model JSM-T20 made by Japan Electron Co., Ltd.) to examine the surface pore size and the internal structure (pore sizes and the like).

5) Separation Properties

A holder having a membrane after a treatment to impart hydrophilicity or a module was prepared in a similar way as that of 2), and then a dispersed solution having 0.1% by weight of a uniform polystyrene latex (made by Dow Chemical) was filtrated in such a way so that 10 ml is obtained per each 100 cm2 of the effective membrane surface area under a pressure difference of 0.7 Kg/cm$^2$, then the passing amount of polystyrene latex having a specific particle size was obtained from the measured light absorbance of the filtrate, whereby the particle blocking rate of the membrane for the latex particles was calculated and the particle size at which the blocking rate became not lower than 95% was designated as the separation particle size of the membrane.

6) Repercolation Properties

A membrane was dried after hot water was percolated at 80° C. for 30 days. Water was percolated through this membrane to measure the water flux, and the water flux of a dry membrane before any use was measured, wherein these values were compared to make an evaluation. The results of measurement are represented by the marks of ⊙ good; ○ generally good; and×decrease.

7) Measurement Method of Equilibrium Moisture Content

The moisture content of a polymerized bulk at equilibrium was measured according to ASTM-D570.

8) Breaking Strength and Breaking Extension

A tensile test was carried out on a membrane having the test length of 20mm under a condition wherein the temperature was set at 20° C. while the humidity was set at 65% and the speed of tensile test was set at 20 mm/min., whereby the strength and extension when the membrane breaked were measured 5 times to obtain the average values which were designated as breaking strength and breaking extension, respectively.

EXAMPLES 1 AND 2

By using an polymer dope obtained by dissolving polysulfonic polymer having PAS and PES in such combinations as those shown in Table 1-1 into a solvent of dimethylacetamide (hereinafter referred to as DMAc) so that the total polymer concentration becomes 12% by weight, each of these polymer dope was casted to have a thickness of 175 µm on a flat plate, immediately followed by being immersed in an external solidifying solution having a ratio of DMAc/ water=50/50 (% by weight) and a temperature of 30° C., whereby a solidifying membrane was obtained. This solidified membrane was successively subjected to a solvent removal treatment by washing with warm water, and then it was dried by hot air. The polymer compositions of the membrane thus obtained are shown in Table 1-2. No pinhole with sizes of not less than $5\mu$ was observed in these membranes (Bubble Point Method). The water flux and water flux ratio were measured and are shown in Table 1-2. Both of these membranes showed a high water flux, and even the dry membrane which was not subjected to any treatment to impart hydrophilicity could be percolated under a low pressure difference. Furthermore, no dissolved component deriving from the membrane material was detected in the filtrate obtained by the permeation treatment of the membrane. When the membrane structure was examined with a scanning electron microscope, an infinite number of small pores having pore sizes of about 0.1–0.2 $\mu$m were observed in the dense membrane surface. When the cross section of the membrane was examined, a dense layer having mesh like pores with pore sizes of 0.1–1 $\mu$m was observed, wherein the pores forming a network became gradually coarser from the dense surface toward the inside thereof.

Furthermore, an asymmetric structure was observed, wherein the structure provided a supporting layer having pores with sizes of about 1–70 $\mu$m and had a mesh-like structure which was coarser than that of the dense layer along the region from the internal layer being successively connected with such a layer to the opposite surface.

COMPARISION 1–3

A membrane was manufactured by a similar method as that of Example 1 by using a polymer dope obtained by dissolving various polysulfonic polymer as shown in Comparisons 1 through 3 of Table 2-1 into DMAc so that the total polymer concentration becomes 12% by weight, and the polymer composition, the water flux and water flux ratio of the membrane thus obtained are shown in Table 2-2. When compared with the membrane of the present invention, the water flux of the membrane after a treatment to impart hydrophilicity showed an extremely low value being not higher than 1 L/m$^2$.hr.mmHg and the percolation of water was hardly possible through the membrane without any treatment to impart hydrophilicity and the water flux ratio showed an extremely poor value of not higher than 15%.

EXAMPLE 3

A polymer dope obtained by dissolving a mixture having a polymer at such concentration so that PAS/PES=7/6 (weight ratio) into DMAc in such a way that the polymer concentration became 13% by weight was extruded from the sheath side of a double annular sheath/core type nozzle and an internal solidifying solution (DMAc/water=70/30 (by weight)) was extruded respectively from the core side of said nozzle, and then the membrane was introduced into an external solidifying solution (DMAc/water=60/40 (by weight)) being kept at 50° C. after letting the membrane pass through a distance of 10 mm in air to effect a wet solidification. A hot air drying was employed after removing the solvent by washing the membrane for 24 hours by hot water kept at 80° C., whereby a hollow fiber membrane having a ratio of PAS/PES=54/46 (by weight) was obtained.

The hollow fiber thus obtained had an external size of $550\mu$ and a membrane thickness of $100\mu$, and had an asymmetric structure with a fine mesh-like layer on the outside. An infinite number of micropores having diameters of about 0.1–1 $\mu$m were existing in the dense layer in the vicinity of the outer surface, and a mesh-like layer was provided wherein the pore sizes gradually became coarser from the outside surface to the inner region.

Furthermore, the region from the inner region to the inside surface provided a supporting layer having a mesh-like structure wherein pore sizes of pores made by coarser polymer network increased toward the inside surface, and relatively large pores having diameters of about 1–20$\mu$ were observed in such a region. Furthermore, no pin-hole having a size of not smaller than $5\mu$ when measured by Bubble Point Method was observed.

The water flux of this membrane was 15 L/m$^2$.hr.mmHg, and, with this membrane, percolation of water could be effected from a dry condition without any requirement of a special treatment to impart hydrophilicity, and the water flux ratio obtained as a ratio of dry membrane to hydrophilic membrane was high being at 78%. Furthermore, the repercolation test was carried out, but no change in the percolation propertie were observed.

In addition, the maintenance ratio of extension breaking of this hollow fiber membrane after a hot water treatment under pressure at 150° C. (for 21 days) was high being at 90%, thereby showing an excellent resistance to moist heat.

EXAMPLE 4

7.5% by weight of PAS and 7.5% by weight of PES were dissolved while being hot in 85% by weight of DMAc. A hollow fiber membrane was obtained by a dry-wet spinning method, wherein this solution was extruded as the polymer dope for spinning from the sheath side of a double annular sheath/core type nozzle, and 60% by weight of DMAc water solution was extruded as the internal solidifying agent from the core side, whereby the extruded polymer was introduced into an external solidifying solution being a water solution having 40% by weight of DMAc being kept at 70° C., after being let to once pass a distance of 20 mm in the air. This membrane was washed for 24 hours by a hot water being kept at 80° C. whereby the solvent was removed, followed by a drying in hot air, and then a hollow fiber membrane having a ratio of PAS/PES=50/50 (by weight) was obtained. The water flux of the hollow fiber membrane thus obtained was 12.5 L/m$^2$.hr.mmHg. Furthermore, the maintenance ratio at breaking extension of the membrane measured by a test for the resistance to moist heat was 85% and the water flux ratio was 95%.

EXAMPLE 5

9.0% by weight of PAS, 6.0% by weight of PES, and 0.3% by weight of PVP (K-90) and 4.0% by weight of PVP (K-30), respectively, were dissolved while being hot in 80.7% by weight of DMAc. By using this solution as the polymer dope for spinning, a hollow fiber membrane was obtained by the method of spinning, washing and drying which was similar to that of Example 3 except that 70% by weight of DMAc water solution was used as the internal solidifying solution. The composition of the hollow fiber membrane thus obtained had a ratio of roughly PAS/PES/PVP=59/40/1 (by weight).

The water flux of the hollow fiber membrane thus obtained was 21.8 L/m$^2$.hr.mmHg. Furthermore, the maintenance ratio at breaking extension of the membrane measured by a test for the resistance to moist heat was 82% and the water flux ratio was 90%. EXAMPLES 6–8

A hollow fiber membrane was obtained by the method of spinning, washing and drying similar to that of Example 5 except that the composition of the polymer dope for spinning was changed so that membranes having compositions as shown in Table 1-2 could be obtained. The performance characteristics of the hollow fiber membrane thus obtained are shown in Table 1-2. The membrane obtained in each case showed an excellent permeability, an excellent resistance to moist heat, and an excellent hydrophilicity.

EXAMPLE 9

A hollow fiber membrane was manufactured by a method similar to that of Example 3 by using a polymer dope obtained by dissolving 9% by weight of PAS, 6% by weight of PES, and 0.5% by weight of PVP (K-90) and 3.0% by weight of PVP (K-30), respectively, as the polymer dope for manufacturing a membrane. The internal solidifying solution was such that DMAc/water=70%/30% (by weight), and the external solidifying solution was such that DMAc/water=40%/60% (by weight) while the temperature was 70° C.

When the above-mentioned manufacturing of the membrane was continuously operated for 48 hours, the number of fiber break during the production process was three, whereby a stable manufacture of the membrane was made possible. The thick membrane spots in the cross section of the hollow fiber membrane thus obtained were small and they had regular configurations. Table 1-2 shows the water flux, water flux ratio, repercolation characteristics and resistance to humidity coupled with heat of these membranes.

EXAMPLE 10

A hollow fiber membrane was manufactured by a method similar to that of Example 3 by using a polymer dope obtained by dissolving 10.3% by weight of PAS, 6.9% by weight of PES, and 4.8% by weight of PVP (K-90), as the polymer dope for manufacturing a membrane. The internal solidifying solution was such that DMAc/water=65%/35% (by weight), and the external solidifying solution was such that DMAc/water=40%/60% (by weight) while the temperature was 70° C. The number of break during the production process when the abovementioned manufacturing of the membrane was continuously operated for 48 hours was one, whereby a stable manufacture of the membrane was made possible. The thick membrane spots in the cross section of the hollow fiber membrane thus obtained were small and they had regular configurations.

Table 1-2 shows the water flux, the water flux ratio, the repercolation properties and the resistance to moist heat of these membranes.

COMPARISION 4–8

A hollow fiber membrane was obtained by the method of spinning, washing and drying which was similar to those of Example 2 except that the composition of the polymer dope for spinning was changed so that membranes having compositions as shown in Table 1-2 were obtained and that the internal solidifying solution and the composition/temperature of the external solidifying solution were changed to provide an appropriate condition. The performance characteristics of the hollow fiber membrane thus obtained are shown in Table 2-2. The membrane obtained in either case showed that it was possible to satisfy the performance requirement partially but that it was not possible to satisfy all performance requirements.

FIELD OF INDUSTRIAL APPLICATIONS

As can be seen from the above descriptions, a membrane that can be used continuously in a percolation of hot water, in a high pressure steam sterilization treatment and the like where a high performance is required is provided by using a porous membrane of the present invention which provides an excellent resistance to moist heat, and excellent hydrophilicity and permeability.

TABLE 1-1

Examples (Conditions for Manufacturing Membranes)

| | Membrane Embodiments | Total Polymer Content | PAS | PES | PVPK30 | PVPK90 | DMAc | Viscosity of Polymer Dope CPS | Internal Solidifying Solution (% by weight) DMAc | Water | Temperature (° C.) | External Solidifying Solution (% by weight) DMAc | Water | Temperature (° C.) |
|---|---|---|---|---|---|---|---|---|---|---|---|---|---|---|
| Example 1 | Flat Membrane | 12 | 3.6 | 8.4 | — | — | 88 | 100 | — | — | — | 50 | 50 | 30 |
| Example 2 | Flat Membrane | 12 | 7.2 | 4.8 | — | — | 88 | 120 | — | — | — | 50 | 50 | 30 |
| Example 3 | Hollow Fiber Membrane | 13 | 7.0 | 6.0 | — | — | 87 | 230 | 70 | 30 | 30 | 60 | 40 | 50 |
| Example 4 | Hollow Fiber Membrane | 15 | 7.5 | 7.5 | — | — | 85 | 250 | 60 | 40 | 30 | 40 | 60 | 70 |
| Example 5 | Hollow Fiber Membrane | 19.3 | 9.0 | 6.0 | 4.0 | 0.3 | 80.7 | 550 | 70 | 30 | 30 | 40 | 60 | 70 |
| Example 6 | Hollow Fiber Membrane | 15 | 10.5 | 4.5 | — | — | 85 | 370 | 70 | 30 | 30 | 40 | 60 | 70 |
| Example 7 | Hollow Fiber Membrane | 18.5 | 7.5 | 7.5 | 3.0 | 0.5 | 81.5 | 600 | 70 | 30 | 30 | 40 | 60 | 70 |

TABLE 1-1-continued

Examples (Conditions for Manufacturing Membranes)

| | Membrane Embodiments | Composition of Polymer Dope | | | | | Viscosity of Polymer Dope CPS | Internal Solidifying Solution (% by weight) | | | External Solidifying Solution (% by weight) | | |
|---|---|---|---|---|---|---|---|---|---|---|---|---|---|
| | | Total Polymer Content | PAS | PES | PVPK30 | PVPK90 | DMAc | | DMAc | Water | Temperature (°C.) | DMAc | Water | Temperature (°C.) |
| Example 8 | Hollow Fiber Membrane | 15 | 4.5 | 10.5 | — | — | 85 | 220 | 70 | 30 | 30 | 40 | 60 | 70 |
| Example 9 | Hollow Fiber Membrane | 18.5 | 9.0 | 6.0 | 3.0 | 0.5 | 81.5 | 530 | 70 | 30 | 30 | 40 | 60 | 70 |
| Example 10 | Hollow Fiber Membrane | 22 | 10.3 | 6.9 | — | 4.8 | 78 | 18000 | 65 | 35 | 30 | 40 | 60 | 70 |

TABLE 1-2

Examples (Membrane Structure and Membrane Properties)

| | Membrane Composition | | | Pore Size (μm) | | Dimension (μm) | | Separation Particle Size (μm) | Water Flux (L/m² · hr · mmHg) |
|---|---|---|---|---|---|---|---|---|---|
| | PAS | PES | PVP | Dense Layer | Supporting Layer | External Deameter | Membrane Thickness | | |
| Example 1 | 30 | 70 | — | 0.1~1.0 | 1.0~70 | | 80 | 0.20 | 17.2 |
| Example 2 | 60 | 40 | — | 0.1~1.0 | 1.0~50 | | 100 | 0.20 | 19.2 |
| Example 3 | 54 | 46 | — | 0.1~1.0 | 1.0~20 | 550 | 100 | 0.20 | 15.0 |
| Example 4 | 50 | 50 | — | 0.1~1.0 | 1.0~30 | 530 | 90 | 0.30 | 12.5 |
| Example 5 | 59 | 40 | 1 | 0.01~1.0 | 1.0~10 | 500 | 80 | 0.10 | 21.8 |
| Example 6 | 70 | 30 | — | 0.01~1.0 | 1.0~10 | 500 | 80 | 0.10 | 17.8 |
| Example 7 | 49 | 49 | 2 | 0.01~1.0 | 1.0~10 | 510 | 80 | 0.20 | 22.0 |
| Example 8 | 30 | 70 | — | 0.01~1.0 | 1.0~10 | 560 | 90 | 0.10 | 13.2 |
| Example 9 | 59 | 40 | 1 | 0.01~1.0 | 1.0~10 | 490 | 80 | 0.10 | 21.5 |
| Example 10 | 59 | 40 | 1 | 0.01~1.0 | 1.0~5 | 600 | 100 | 0.04 | 11.8 |

| | Water Flux Ratio (%) | Maintenance Ratio of Extension (%) | Re-percolation Property | Equilibrium Water Content (%) | Breaking Strength (kg/cm²) | Breaking Extension (%) |
|---|---|---|---|---|---|---|
| Example 1 | 80 | 73 | ○ | 0.4 | 40 | 25 |
| Example 2 | 75 | 80 | ⊙ | 0.4 | 43 | 22 |
| Example 3 | 78 | 90 | ⊙ | 0.4 | 40 | 20 |
| Example 4 | 95 | 85 | ⊙ | 0.4 | 42 | 30 |
| Example 5 | 90 | 82 | ⊙ | 0.7 | 45 | 32 |
| Example 6 | 80 | 85 | ⊙ | 0.4 | 48 | 35 |
| Example 7 | 92 | 80 | ⊙ | 0.9 | 43 | 38 |
| Example 8 | 85 | 75 | ○ | 0.4 | 42 | 28 |
| Example 9 | 82 | 80 | ⊙ | 0.7 | 45 | 30 |
| Example 10 | 82 | 88 | ⊙ | 0.7 | 67 | 46 |

TABLE 2-1

Comparisons (Conditions for Manufacturing Membranes)

Composition of Polymer Dope

| | Membrane Embodiments | Total Polymer Content | PAS | PES | PSF | PVPK30 | PVPK90 | DMAc |
|---|---|---|---|---|---|---|---|---|
| Comparison 1 | Flat Membrane | 12 | 12 | — | — | — | — | 88 |
| Comparison 2 | Flat Membrane | 12 | — | 12 | — | — | — | 88 |
| Comparison 3 | Flat Membrane | 12 | — | — | 12 | — | — | 88 |
| Comparison 4 | Hollow Fiber Membrane | 18.5 | 15 | — | — | 3.0 | 0.5 | 81.5 |
| Comparison 5 | Hollow Fiber Membrane | 18.5 | — | 15 | — | 3.0 | 0.5 | 81.5 |
| Comparison 6 | Hollow Fiber Membrane | 18.5 | — | — | 15 | 3.0 | 0.5 | 81.5 |
| Comparison 7 | Hollow Fiber Membrane | 18.5 | 14 | 1 | — | 3.0 | 0.5 | 81.5 |
| Comparison 8 | Hollow Fiber Membrane | 18.5 | 1 | 14 | — | 3.0 | 0.5 | 81.5 |

| | Viscosity of Polymer Dope CPS | Internal Solidifying Solution (% by weight) | | | External Solidifying Solution (% by weight) | | |
|---|---|---|---|---|---|---|---|
| | | DMAc | Water | Temperature (°C.) | DMAc | Water | Temperature (°C.) |
| Comparison 1 | 260 | — | — | — | 50 | 50 | 30 |
| Comparison 2 | 100 | — | — | — | 50 | 50 | 30 |
| Comparison 3 | 300 | — | — | — | 50 | 50 | 30 |
| Comparison 4 | 700 | 70 | 30 | 30 | 40 | 60 | 70 |
| Comparison 5 | 450 | 70 | 30 | 30 | 40 | 60 | 70 |
| Comparison 6 | 800 | 70 | 30 | 30 | 40 | 60 | 70 |
| Comparison 7 | 650 | 70 | 30 | 30 | 40 | 60 | 70 |
| Comparison 8 | 480 | 70 | 30 | 30 | 40 | 60 | 70 |

TABLE 2-2

Comparisons (Membrane Structure and Membrane Properties)

| | Membrane Composition (% by weight) | | | | Pore Size ($\mu m$) | | Dimension ($\mu m$) | | Separation Particle Size ($\mu m$) |
|---|---|---|---|---|---|---|---|---|---|
| | PAS | PES | PS | PVP | Dense Layer | Supporting Layer | External Deameter | Membrane Thickness | |
| Comparison 1 | 100 | — | — | — | <0.01 | Occurrence of Finger Type Pores | | 120 | <0.04 |
| Comparison 2 | — | 100 | — | — | <0.01 | Occurrence of Finger Type Pores | | 90 | <0.04 |
| Comparison 3 | — | — | 100 | — | <0.01 | Occurrence of Finger Type Pores | | 130 | <0.04 |
| Comparison 4 | 98 | — | — | 2 | <0.01~1 | 1.0~50 | 520 | 90 | <0.04 |
| Comparison 5 | — | 98 | — | 2 | <0.01~1 | 1.0~60 | 470 | 70 | <0.04 |
| Comparison 6 | — | — | 91 | 9 | 0.1~1.0 | 1.0~30 | 500 | 80 | 0.30 |
| Comparison 7 | 94 | 5 | — | 1 | 0.01~1.0 | 1.0~50 | 550 | 100 | <0.04 |
| Comparison 8 | 5 | 94 | — | 1 | 0.01~1.0 | 1.0~50 | 510 | 80 | <0.04 |

TABLE 2-2-continued

Comparisons (Membrane Structure and Membrane Properties)

| | Membrane Composition | | Pore Size ($\mu$m) | | Dimension ($\mu$m) | | | Separation Particle |
|---|---|---|---|---|---|---|---|---|
| | Water Flux (L/m² · hr · mmHg) | Water Flux Ratio (%) | Maintenance Ratio of Extension (%) | Re-percolation Property | Equilibrium Water Content (%) | Breaking Strength (kg/cm²) | Breaking Extension (%) | |
| Comparison 1 | 0.4 | 9 | 90 | ◉ | 0.4 | 78 | 7 | |
| Comparison 2 | 0.2 | 12 | 68 | X | 0.4 | 48 | 15 | |
| Comparison 3 | 0.5 | 8 | Not Available※ | X | 0.4 | 60 | 12 | |
| Comparison 4 | 1.5 | 3 | 98 | ◉ | 0.9 | 70 | 13 | |
| Comparison 5 | 1.8 | 17 | 75 | X | 2.7 | 35 | 25 | |
| Comparison 6 | 15.5 | 80 | Not Available※ | X | 3.1 | 28 | 45 | |
| Comparison 7 | 1.6 | 5 | 95 | ◉ | 0.7 | 64 | 12 | |
| Comparison 8 | 4.2 | 12 | 70 | X | 0.7 | 56 | 16 | |

※ The measurement was not possible because of a substantial change in the configuration.

What is claimed is:

1. A polysulfone porous membrane comprising a mixed polymer consisting essentially of a polyarylsulfone having repeating units of the formula:

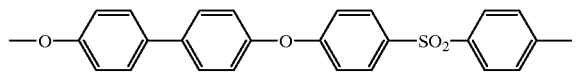

and a polyethersulfone having repeating units of the formula:

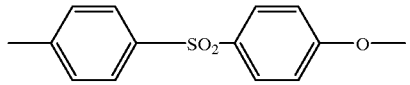

at a ratio of polyarylsulfone to polyethersulfone of from 9/1–1/9 by weight, said membrane being a graded porous membrane forming a mesh-like polymer network having a number of interconnected micropores from one surface to the other surface and comprising two layers wherein one layer is a dense layer having a plurality of pores with pore sizes of from 0.01 to 1 $\mu$m for performing a separation function, and a second layer is a supporting layer for supporting said dense layer and having a plurality of pores with pore sizes of from 1 to 100 $\mu$m, the sizes of said pores of the supporting layer increasing continuously from a side thereof nearest the dense layer toward a side opposite therefrom, said membrane being capable of separating particles having a size not larger than 0.5 $\mu$m, and wherein the water flux of the membrane measured under a difference of 2 Kg/cm² is not lower than 7 L/m².hr.mmHg.

2. The polysulfone porous membrane of claim 1 wherein a maintenance ratio of extension of the membrane calculated according to the following equation is not lower than 70%:

$$\text{Maintenance Rate at Extension breaking (\%)} = \frac{\text{Breaking Extension of Polysulfone Porous Membrane after Treatment under Moist Heat}}{\text{Breaking Extension of Polysulfone Porous Membrane before Treatment under Moist Heat}} \times 100(\%)$$

wherein treatment under moist heat represents a treatment of the polysulfone porous membrane with hot water under a pressure of 150° C. for 21 days in an autoclave.

3. The polysulfone porous membrane of claim 1 wherein said membrane is capable of separating particles having a size not larger than 0.2 $\mu$m.

4. The polysulfone porous membrane of claim 1 wherein an equilibrium moisture content of the membrane is not higher than 2% by weight.

5. The polysulfone porous membrane of claim 1 wherein the breaking strength of the membrane is not lower than 40 Kg/cm² and the breaking extension of the membrane is not smaller than 20%.

* * * * *

UNITED STATES PATENT AND TRADEMARK OFFICE
CERTIFICATE OF CORRECTION

PATENT NO. : 6,284,137 B1
DATED : September 4, 2001
INVENTOR(S) : Akira Hajikano et al.

Page 1 of 1

It is certified that error appears in the above-identified patent and that said Letters Patent is hereby corrected as shown below:

<u>Column 18, claim 1,</u>
Line 23, before "difference", insert -- pressure --.

Signed and Sealed this

Nineteenth Day of March, 2002

Attest:

Attesting Officer

JAMES E. ROGAN
*Director of the United States Patent and Trademark Office*